United States Patent
Marechal et al.

(10) Patent No.: US 7,972,706 B2
(45) Date of Patent: Jul. 5, 2011

(54) ADHESION OF POLYETHYLENE ON POLYPROPYLENE

(75) Inventors: Philippe Marechal, Nivelles (BE); Philippe Le Coz, Doha (QA); Christian Daffe, La Louvière (BE)

(73) Assignee: Total Petrochemicals Research Feluy, Seneffe (Feluy) (BE)

( * ) Notice: Subject to any disclaimer, the term of this patent is extended or adjusted under 35 U.S.C. 154(b) by 323 days.

(21) Appl. No.: 10/491,692

(22) PCT Filed: Oct. 3, 2002

(86) PCT No.: PCT/EP02/11264
§ 371 (c)(1),
(2), (4) Date: Sep. 17, 2004

(87) PCT Pub. No.: WO03/031509
PCT Pub. Date: Apr. 17, 2003

(65) Prior Publication Data
US 2005/0019596 A1      Jan. 27, 2005

(30) Foreign Application Priority Data

Oct. 3, 2001  (EP) .................................... 01203743
Oct. 15, 2001 (EP) .................................... 01203875

(51) Int. Cl.
*B32B 27/08* (2006.01)
(52) U.S. Cl. ...................................................... 428/516
(58) Field of Classification Search .................. 428/516
See application file for complete search history.

(56) References Cited

U.S. PATENT DOCUMENTS

| | | | |
|---|---|---|---|
| 5,358,792 A | | 10/1994 | Mehta et al. |
| 5,888,636 A | * | 3/1999 | Asanuma et al. ............. 428/213 |
| 5,972,520 A | | 10/1999 | Howell |
| 6,027,776 A | * | 2/2000 | Mueller ........................ 428/35.2 |
| 6,127,293 A | * | 10/2000 | Kimura et al. ................. 442/199 |
| 6,214,469 B1 | * | 4/2001 | Sukhadia et al. ............. 428/421 |
| 6,270,867 B1 | | 8/2001 | Eckstein et al. |
| 6,287,700 B1 | * | 9/2001 | Kong et al. .................... 428/447 |
| 6,333,096 B1 | * | 12/2001 | Rodgers et al. ............... 428/213 |
| 6,500,505 B2 | | 12/2002 | Piper et al. |
| 6,511,568 B1 | | 1/2003 | Eckstein et al. |
| 2003/0027008 A1 | * | 2/2003 | Eckstein et al. ............. 428/516 |
| 2003/0030174 A1 | * | 2/2003 | Gray et al. ................ 264/171.28 |
| 2003/0091849 A1 | * | 5/2003 | Tavernier ..................... 428/515 |

FOREIGN PATENT DOCUMENTS

| | | |
|---|---|---|
| EP | 0850756 A2 | 7/1998 |
| JP | 55-108433 A | 8/1980 |
| JP | 10-309789 A | 11/1998 |
| JP | 2000-198171 A | 7/2000 |

OTHER PUBLICATIONS

Anthony J Pearson, "Metallo-Organic Chemistry", 1985 Wiley, pp. 310-313.*

* cited by examiner

*Primary Examiner* — Sheeba Ahmed

(57) ABSTRACT

This invention provides a multi-layer film or sheet prepared by coextruding or laminating polypropylene with one or more polyethylene(s), characterised in that the adhesion between a polypropylene layer and a polyethylene layer is provided by a metallocene-produced polyethylene.

19 Claims, 1 Drawing Sheet

ADHESION OF POLYETHYLENE ON POLYPROPYLENE

The field of this invention is the control of adhesion of polyethylene onto polypropylene without tie additives, in coextrusion, lamination or blending.

It is desirable to produce polypropylene films having the improved sealing performance of the polyethylene but it is known in the art that polyethylene does not adhere onto polypropylene in the absence of tie additives or in the absence of modification of the polyethylene.

For example, in an article published in Science, vol. 288, p. 2187, 2000, it is stated that polyethylene and polypropylene do not adhere to each other.

U.S. Pat. No. 6,262,174 discloses the addition by blending of 2 to 13 wt % of polypropylene into a substantially linear polyethylene and/or a low density polyethylene in order to prepare a heat-sealable film layer having improved hot tack properties. The blend is used to prepare a mono-extrusion film and there is no mention of adhesion between polyethylene and polypropylene.

At the $8^{th}$ annual European polymers, Films, Lamination and Extrusion Coating Conference, a presentation by Anna Perez Moreno discloses the adhesion of polyolefin plastomers (POP) on oriented polypropylene (OPP) films. It describes that the adhesion of POP on OPP depends upon the density of the POP, the lower density product having a better adhesion. It further describes that modification of the POP can improve its adhesion onto the OPP. It is silent about the adhesion of POP on polypropylene in coextrusion or lamination.

The polypropylene is difficult to extrude in blown film processes other than the double bubble process that is costly. It is thus desirable to include polyethylene in order to facilitate the extrusion of polypropylene in blown film applications.

There is a need for preparing films or sheets that have the low sealing temperature and the good shrink properties of the polyethylene and the good rigidity of the polypropylene. It is therefore desirable to coextrude polyethylene and polypropylene without tie layer or without modifying the polyethylene. A typical tie layer is costly and requires more complex extrusion machines.

It is an aim of the present invention to prepare films or sheets by coextruding, laminating or blending polyethylene and polypropylene without tie layer and without modifying the polyethylene.

It is another aim of the present invention to improve the adhesion between polyethylene and polypropylene.

It is a further aim of the present invention to produce films or sheets with low sealing temperature.

It is yet another aim of the present invention to produce films or sheets having simultaneously good optical properties and adequate rigidity.

It is also an aim of the present invention to facilitate the extrusion in blown film applications and to improve the bubble stability.

It is yet a further aim of the present invention to produce films or sheets with improved shrink properties.

It is yet another aim of the present invention to prepare coextruded blow moulded hollow packaging that can be easily removed from the mould.

Figure 1:
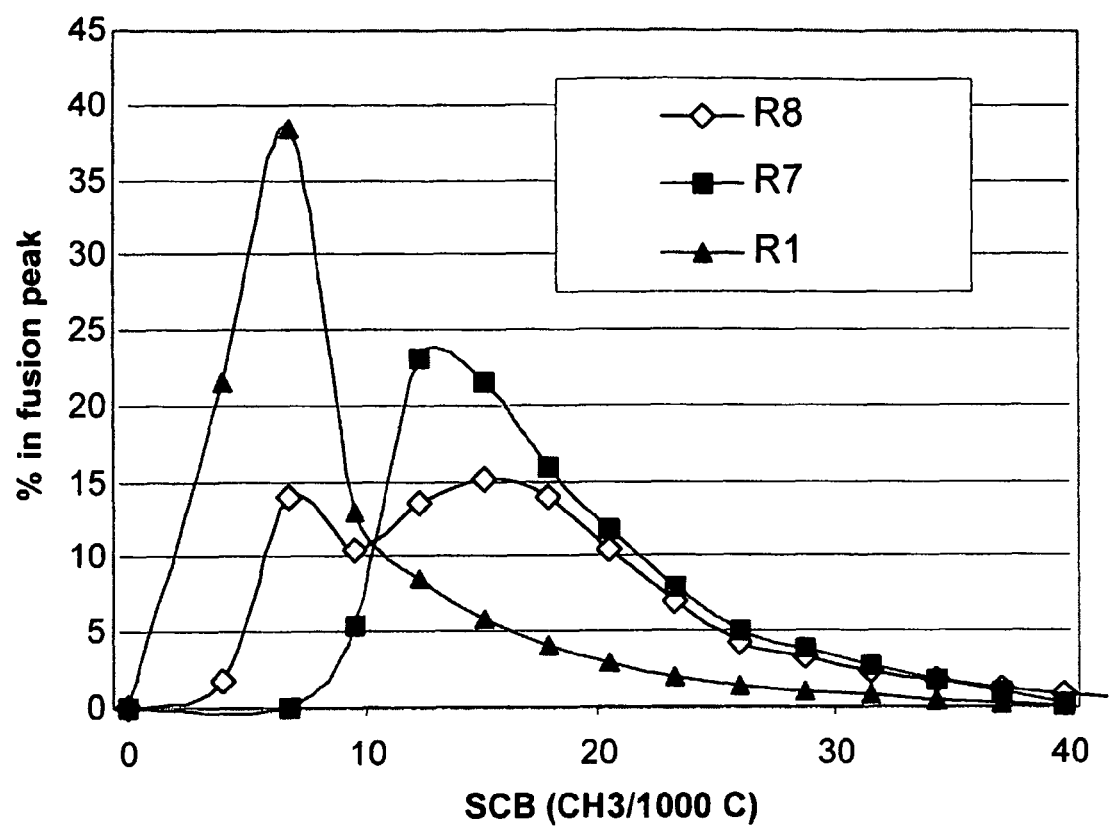
FIG. 1 represents the SIST results for various resin samples.

The present invention provides multi-layer films or sheets prepared by coextruding or laminating polypropylene with one or more polyethylene(s), characterised in that the adhesion between a polypropylene layer and a polyethylene layer is provided by a metallocene-produced polyethylene (mPE).

In a preferred embodiment according to the present invention the polypropylene layer can be the internal layer of a film or sheet wherein the external layers are metallocene-produced polyethylenes. These films or sheets have simultaneously high rigidity and good sealing properties.

In another further preferred embodiment according to the present invention, the metallocene-produced polyethylene layer is used as a tie layer between a polypropylene layer and a polyethylene layer in the production of films or sheets with good shrink properties.

In further preferred embodiment of the present invention, the mPE and the polypropylene are coextruded to produce a blown film having at least two layers. The polyethylene facilitates the extrusion of the blown films and provides melt stability. It also improves the bubble stability.

Alternatively, the films or sheets are prepared from a blend of polyethylene and polypropylene, wherein the polyethylene is prepared with a metallocene catalyst in order to provide compatibility between the polypropylene and polyethylene.

All the films or sheets produced according to the present invention have excellent optical properties, both in transparency and in gloss as a result of the improved interface between polyethylene and polypropylene. In addition, they have excellent rigidity because of the polypropylene.

In another embodiment of the present invention, the mPE and the polypropylene are coextruded and used in blow moulding applications such as hollow packaging and bottles. It is preferred that the external layer is the mPE layer in order to facilitate the unmoulding operation and thereby reduce the cycle time.

The polypropylene used in the present can be any polypropylene suitable for the production of films or sheets. It can be a homopolymer or copolymer or terpolymer of propylene prepared with a Ziegler-Natta catalyst or a physical or chemical blend thereof. Alternatively a polypropylene produced by a metallocene catalyst can be a homopolymer, a copolymer, being either a random or block copolymer, or terpolymer of isotactic or of syndiotactic polypropylene such as disclosed for example in EP-A -881,236, EP-A-965,603, EP-A-1,010, 709 or WO-00/49209.

The metallocene-produced polyethylene resin used in the present invention can be prepared with any metallocene catalyst known in the art given by the general formula:

wherein Cp is a cyclopentadienyl ring, M is a group 4b, 5b or 6b transition metal, R is a hydrocarbyl group or hydrocarboxy having from 1 to 20 carbon atoms, X is a halogen, and m-1-3, n=0-3, q=0-3 and the sum m+n+q is equal to the oxidation state of the metal.

wherein $(C_5R'_k)$ is a cyclopentadienyl or substituted cyclopentadienyl, each R' is the same or different and is hydrogen or a hydrocarbyl radical such as alkyl, alkenyl, aryl, alkylaryl, or arylalkyl radical containing from 1 to 20 carbon atoms or two carbon atoms are joined together to form a $C_4$-$C_6$ ring, R" is a $C_1$-$C_4$ alkylene radical, a dialkyl germanium or silicon or siloxane, or a alkyl phosphine or amine radical bridging two $(C_5R'_k)$ rings, Q is a hydrocarbyl radical such as aryl, alkyl, alkenyl, alkylaryl, or aryl alkyl radical having from 1-20 carbon atoms, hydrocarboxy radical having 1-20 carbon atoms or halogen and can be the same or different from each other, Q' is an alkylidene radical having from 1 to about 20 carbon atoms, s is 0 or 1, g is 0, 1 or 2, s is 0 when g is 0, k is 4 when s is 1 and k is 5 when s is 0, and M is as defined above.

Among the preferred metallocenes used in the present invention, one can cite among others bis tetrahydro-indenyl compounds and bis indenyl compounds as disclosed for example in WO 96/35729, or bis (n-butyl-cyclopentadienyl) compounds. The most preferred metallocene catalyst is ethylene bis (4,5,6,7-tetrahydro-1-indenyl) zirconium dichloride.

The metallocene may be supported according to any method known in the art. In the event it is supported, the support used in the present invention can be any organic or inorganic solids, particularly porous supports such as talc, inorganic oxides, and resinous support material such as polyolefin. Preferably, the support material is an inorganic oxide in its finely divided form.

The addition of a cocatalyst having an ionising action creates an active site.

Preferably, alumoxane is used as cocatalyst during the polymerization procedure, and any alumoxane known in the art is suitable.

The preferred alumoxanes comprise oligomeric linear and/or cyclic alkyl alumoxanes represented by the formula:

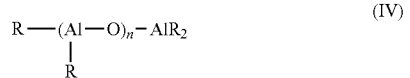

for oligomeric, linear alumoxanes and

for oligomeric, cyclic alumoxanes,
wherein n is 1-40, preferably 10-20, m is 3-40, preferably 3-20 and R is a $C_1$-$C_8$ alkyl group and preferably methyl.

Methylalumoxane is preferably used.

When alumoxane is not used as a cocatalyst, one or more aluminiumalkyl represented by the formula $AlR_x$ are used wherein each R is the same or different and is selected from halides or from alkoxy or alkyl groups having from 1 to 12 carbon atoms and x is from 1 to 3. Especially suitable aluminiumalkyl are trialkylaluminium, the most preferred being triisobutylaluminium (TIBAL).

The polymerisation of the metallocene-produced polyethylene can be carried out in gas, solution or slurry phase. Slurry polymerisation is used to prepare the medium and high density polyetyhlene. Gas phase polymerisation is preferred to prepare low density polyethylene. Solution polymerisation is preferred for the production of very low density polyethylene. The polymerisation temperature ranges from 20 to 125° C., preferably from 60 to 95° C. and the pressure ranges from 0.1 to 5.6 Mpa, preferably from 2 to 4 Mpa, for a time ranging from 10 minutes to 4 hours, preferably from 1 and 2.5 hours.

A continuous single loop reactor is preferably used for conducting the polymerisation under quasi steady state conditions.

The average molecular weight is controlled by adding hydrogen during polymerisation. The relative amounts of hydrogen and olefin introduced into the polymerisation reactor are from 0.001 to 15 mole percent hydrogen and from 99.999 to 85 mole percent olefin based on total hydrogen and olefin present, preferably from 0.2 to 3 mole percent hydrogen and from 99.8 to 97 mole percent olefin.

The density of the polyethylene is regulated by the amount of comonomer injected into the reactor; examples of comonomer which can be used include 1-olefins, typically C3 to C20 olefins among which propylene, butene, hexene, octene, 4-methyl-pentene are preferred, the most preferred being hexene.

The densities of the polyethylenes required for preparing the polyethylene tie layer of the present invention range from 0.910 $g/cm^3$ to 0.965 $g/cm^3$, preferably from 0.917 to 0.960 $g/cm^3$ and most preferably from 0.925 to 0.960 $g/cm^3$. The density is measured at 23° C. following the method of standard test ASTM D 1505.

The melt index of polyethylene is regulated by the amount of hydrogen injected into the reactor. The melt indices useful in the present invention range from 0.001 g/10 min to 1000 g/10 min, preferably from 0.01 to 100 g/10 min and most preferably from 0.05 to 50 g/10 min. For blown films, the most preferred melt index is of from 0.1 to 4 g/10 min. The melt index is measured using the procedures of standard test ASTM D 1238 at 190° C. using a load of 2.16 kg.

The polyethylene resin used in the present invention can be prepared with either a single site metallocene catalyst or with a multiple site metallocene catalyst and it has therefore either a monomodal or a bimodal molecular weight distribution (MWD). A narrow molecular weight distribution is preferred. The molecular weight distribution can be completely defined by means of a curve obtained by gel permeation chromatography. Generally the molecular weight distribution is more simply defined by a parameter known as the dispersion index D, which is the ratio between the average molecular weight by weight (Mw) and the average molecular weight by number (Mn). The dispersion index constitutes a measure of the width of the molecular weight distribution. It is of from 2 to 30, preferably of from 2 to 7 and more preferably of from 2 to 5.

Preferably, the metallocene-produced polyethylene resins has a high Dow Rheological Index (DRI). To characterize the rheological behavior of substantially linear ethylene polymers, S Lai and G. W. Knight introduced (ANTEC '93 Proceedings, Insite™ Technology Polyolefins (ITP)-New Rules in the Structure/Rheology Relationship of Ethylene &-Olefin Copolymers, New Orleans, La., May 1993) a new rheological measurement, the Dow Rheology Index (DRI) which expresses a polymer's "normalized relaxation time as the result of long chain branching". S. Lai et al; (Antec '94, Dow Rheology Index (DRI) for Insite™ Technology Polyolefins (ITP): Unique structure-Processing Relationships, pp. 1814-1815) defined the DRI as the extent to which the rheology of ethylene-octene copolymers known as ITP (Dow's Insite Technology Polyolefins) incorporating long chain branches into the polymer backbone deviates from the rheology of the conventional linear homogeneous polyolefins that are reported to have no Long Chain Branches (LCB) by the following normalized equation:

$$DRI=(365000\ (t_0/\eta_0)-1)/10$$

wherein $t_0$ is the characteristic relaxation time of the material and $\eta_0$ is the zero shear viscosity of the material. The DRI is calculated by least squares fit of the rheological curve (complex viscosity versus frequency) as described in U.S. Pat. No. 6,114,486 with the following generalized Cross equation, i.e.

$$\eta=\eta_0/(1+(\gamma t_0)^n)$$

wherein n is the power law index of the material, η and γ are the measured viscosity and shear rate data respectively. The dynamic rheological analysis was performed at 190° C. and the strain amplitude was 10%. Results are reported according to ASTM D 4440.

It has been observed that when the dynamic rheological analysis is performed at lower temperature, higher DRI values can be obtained and vice-versa.

The metallocene-produced polyethylene resins used in the present invention for the preparation of blown films have preferably DRI values larger than 5/MI2, preferably larger than 10/MI2 and most preferably larger than 20/MI2.

It has also been observed that the amount of crystallisation plays a role in the adhesion of metallocene-produced polyethylene to polypropylene, when measured at high temperature or at low equivalent Short Chain Branches (SCB) content. The amount of crystallisation as a function of short chain branches is studied by the Stepwise Isothermal Segregation Technique (SIST). In this technique, the sample is heated from room temperature (25° C.) to 220° C. at a rate of 200° C./min. It is kept at 220° C. for 5 minutes. It is then dropped to the temperature of 140° C. at a rate of 20° C./min and kept at that temperature for 40 minutes. The temperature is then dropped by steps of 5° C. at a rate of 20° C./min and kept at each step for 40 minutes until the temperature of 90° C. is reached. It is then allowed to cool down to 25° C. at the fastest cooling rate and maintained at 25° C. for 3 minutes. It is next reheated from 25° C. to 180° C. at a rate of 5° C./min. The percentage of crystallisation is deduced from the curve representing the SCB as a function of melting temperature following the method described by Satoru Hosada in Polymer Journal, vol. 20, p. 383, 1988. In the metallocene-produced polyethylene used in the present invention, the percentage of crystallisation corresponding to chains having less than 10 SCB for 1000 carbon atoms is at least 4%, preferably it is at least 7%.

Typically the polypropylene layer represents from 0.5 to 99.9% of the total film or sheet thickness, the remaining percentage being prepared from one or more layers of polyethylene. The preferred percentages of polyethylene and of polypropylene depend upon the application. For example, multi-layer sheets prepared according to the present invention may comprise a thick polypropylene layer with a thin polyethylene layer added for improved sealing or shrink properties.

The polypropylene and polyethylene are coextruded in a flat die or annular die to produce the films or sheets according to the present invention. The extrusion temperature of the polyethylene can be increased to improve the adhesion between the polyethylene and polypropylene.

The sheets of the present invention can be used in the food packaging industry for the production of deep drawn boxes for single meals or deep freeze meals. These boxes, when filled are covered with a lid that is sealed to the boxes. The polyethylene present in the sheet material insures improved sealing properties.

The present invention can also be used to produce blown film applications with improved shrink properties and improved bubble stability. For that application a metallocene-produced polyethylene with a high DRI is preferred.

The present invention can further be used to prepare blow-moulded hollow packaging wherein the external layer is prepared with a metallocene-produced polyethylene in order to provide easy removal from the mould, thereby decreasing the cycle time.

EXAMPLES

The polypropylene used in the examples is sold under the name ATOFINA polypropylene PPH 5042. It is a homopolymer of propylene produced with a Ziegler-Natta catalyst. A homopolymer of propylene represents the candidate having the smallest level compatibility with polyethylene because of its higher crystallinity.

Several polyethylene resins have been tested in coextrusion with the polypropylene to prepare two-layer sheets.
Metallocene-produced Polyethylene Resins.

Resin R1 is a medium density polyethylene prepared with ethylene bis (4,5,6,7-tetrahydro-1-indenyl) zirconium dichloride as follows. The polyethylene resin was obtained by continuous polymerisation in a loop slurry reactor with a supported and ionised metallocene catalyst prepared in two steps by first reacting $SiO_2$ with MAO to produce $SiO_2$.MAO and then reacting 94 wt % of the $SiO_2$.MAO produced in the first step with 6 wt % of ethylene bis-(tetrahydroindenyl) zirconium dichloride. The dry catalyst was slurried in isobutane and pre-contacted with triisobutylaluminium (TiBAl, 10 wt % in hexane) before injection in the reactor. The reaction was conducted in a 70 l capacity loop reactor with the polymerisation temperature being maintained at 85° C. The operating conditions are as follows:
TIBAl: 120 cm³/h
IC4: 26 kg/h
C2: 9 kg/h
C6: 50 cm³/h
H2: 1.2 Nl/h.

Resin R2 is a linear low density polyethylene prepared with a metallocene catalyst based on a bis tetrahydro-indenyl compound.

Resin R3 is a high density polyethylene resin prepared with a metallocene catalyst based on a bis tetrahydro-indenyl compound.

The resins R1 and R3 have a DRI of about 32/MI2.
Comparative Resins.

Resin R4 is a low density radicalar polyethylene resin sold under the name Lacqtene 1020FN24.

Resin R5 is a low density radicalar polyethylene resin sold under the name Lacqtene 1008FE30.

Resins R4 and R5 are prepared with peroxide under a high pressure procedure.

Resin R6 is a high density polyethylene resin having a narrow molecular weight distribution and produced with a Ziegler-Natta catalyst. It has a DRI of zero.

The properties of these resins are summarised in Table I.

TABLE I

| Resin | Density g/cm³ | MI2 g/10 min | MWD |
|---|---|---|---|
| R1 | 0.934 | 0.9 | 2.6 |
| R2 | 0.918 | 1.0 | 2.5 |
| R3 | 0.947 | 0.7 | 2.5 |
| R4 | 0.922 | 2.1 | 5 |
| R5 | 0.930 | 0.2 | 5 |
| R6 | 0.960 | 1.0 | 5 |

The polypropylene and polyethylene resins were coextruded on a Reifenhauser coextruder.

The extrusion parameters for the polypropylene were as follows:
screw diameter: 70 mm
ratio length over diameter L/D: 33
throughput: 220 kg/h
extrusion temperature: 220° C.

The extrusion parameters for the polyethylene were as follows:
screw diameter: 50 mm
ratio length over diameter L/D: 30 throughput: 80 kg/h extrusion temperature: 250° C.

The temperatures of the casting reels were respectively of 40° C., 70° C. and 90° C.

The final product was a web having a total thickness of 1050 microns, the thickness of the polyethylene layer being of about 50 microns.

The adhesion results are displayed in Table II.

TABLE II

| Resin | PE extrusion temp. | Adhesion description |
|---|---|---|
| R1 | 250° C. | Cohesive adhesion |
| R2 | 250° C. | Week adherence |
| R3 | 250° C. | Very cohesive adhesion |
| R4 | 290° C. | Very easy pealing |
| R4 | 310° C. | Easy peeling |
| R5 | 290° C. | Very easy pealing |
| R6 | 250° C. | Easy pealing |

These example show that the use of a metallocene-produced polyethylene provides a good adhesion between polyethylene and polypropylene. Radicalar polyethylene resins like R4 and R5 did not provide sufficient adhesion. As it is believed that the level of adhesion increases with increasing extrusion temperature, resin R4 has been tested at the high extrusion temperature of 310° C.: the level of adhesion was very poor. The temperature was increased further but the resin was degraded before a sufficient level of adhesion could be obtained. The resin R6 produced with a Ziegler-Natta catalyst also provided inadequate adhesion even though its molecular weight distribution was as low as 5.

From the results displayed in Table II it can be observed that the adhesion increases with increasing density of the metallocene-produced polyethylene resin. In addition, as the polypropylene selected for the trials was a highly crystalline homopolymer of propylene, it must be noted that better adhesion results are expected with a copolymer of propylene.

The optical properties were also outstanding both in transparency and gloss as a result of the improved interference between polypropylene and polyethylene and to the good gloss properties of all the metallocene resins.

The adhesion has further been tested with respect to the amount of crystallisation at high temperature. For that purpose the same polypropylene resin as in the previous examples has been coextruded with three different polyethylene resins.

Resins R7 and R8 are polyethylene resins prepared with a metallocene catalyst based on a bis tetrahydro-indenyl compound, both having a density of 0.918 g/cm³, a melt flow index MI2 of 1 g/1 0 min and a molecular weight distribution of about 2.5. They differ by the amount of crystallisation at high temperature or at low equivalent SBC content. Resin R8 shows an amount of crystallisation larger than 5% for chains having less than 10 short chain branches per 1000 carbon atoms, whereas resin R7 shows a percentage of crystallisation of less than 4%. This can be seen in FIG. 1 that represents the SIST results for resins R1, R7 and R8. FIG. 1 is a graph of the percentage in fusion peak as a function of short chain branches, these being represented by the number of $CH_3$ chains per 1000 carbon atoms. The crystallisation values for resin R8 plotted in FIG. 1 and derived from the Satoru Hosada method are exemplified in Table III.

TABLE III

| | T melt (° C.) | Cumulative Area (%) | CH3 (CH3/1000 C.) | Partial Area (%) |
|---|---|---|---|---|
| Peak 1 | 47.5 | 0.07 | 48.05 | 0.07 |
| Peak 2 | 52.5 | 0.29 | 45.30 | 0.22 |
| Peak 3 | 57.5 | 0.73 | 42.55 | 0.44 |
| Peak 4 | 62.5 | 1.44 | 39.80 | 0.71 |
| Peak 5 | 67.5 | 2.56 | 37.06 | 1.12 |
| Peak 6 | 72.5 | 4.23 | 34.31 | 1.67 |
| Peak 7 | 77.5 | 6.61 | 31.56 | 2.38 |
| Peak 8 | 82.5 | 9.87 | 28.81 | 3.26 |
| Peak 9 | 87.5 | 14.08 | 26.06 | 4.21 |
| Peak 10 | 92.5 | 21.0 | 23.31 | 6.92 |
| Peak 11 | 97.5 | 31.45 | 20.56 | 10.45 |
| Peak 12 | 102.5 | 45.32 | 17.81 | 13.87 |
| Peak 13 | 107.5 | 60.37 | 15.06 | 15.05 |
| Peak 14 | 112.5 | 73.92 | 12.31 | 13.55 |
| Peak 15 | 117.5 | 84.40 | 9.56 | 10.48 |
| Peak 16 | 122.5 | 98.27 | 6.81 | 13.87 |
| Peak 17 | 127.5 | 100 | 4.07 | 1.73 |

Resin R9 is a comparative resin: it is a linear low density polyethylene resin produced with a Ziegler-Natta catalyst. It has a density of 0.918 g/cm³ and a melt index MI2 of 1 g/10 min. In addition, it has an amount of crystallisation of about 30% for chains having less then 10 short chain branches per 1000 carbon atoms.

The adhesion results for the three coextruded materials are displayed in Table IV.

TABLE IV

| Resin | PE extrusion temp. | Adhesion description |
|---|---|---|
| R7 | 250° C. | Medium adhesion |
| R8 | 250° C. | Good adhesion |
| R9 | 250° C. | No adhesion |

It can be concluded from these results that for a metallocene-produced catalyst, the adhesion increases with increasing amounts of crystallisation below 10 SCB per 1000 carbon atoms. Crystallisation is not however the decisive factor governing adhesion as Resin R9 having 30% of crystallisation below 10 SCB per 1000 carbon atoms does not adhere at all to polypropylene. The metallocene nature of the polyethylene is thus the factor favoring the adhesion to polypropylene.

It can be concluded from the examples and trials that the preferred metallocene-produced polyethylene for use in the present invention has a density larger than 0.925 g/cm³, a narrow molecular weight distribution, a high level of crystallisation below 10 SCB per 1000 carbon atoms and a high DRI.

Blends of metallocene resins leading to a final resin having crystallisation below 10 SCB per 1000 carbon are expected to provide good adhesion even if one of the resins in the blend has no crystallisation below 10 SCB per 1000 carbon atoms.

The films prepared according to the present invention all showed good shrink properties and good bubble stability.

Soft touch bottles have been prepared by coextruding the resin ADFLEX® Q100F commercialised by Basell with the metallocene-produced polyethylene R1. The adherence between the two layers was excellent.

The invention claimed is:

1. A multilayer film comprising a film layer formed of polypropylene and an adhesive layer formed of a metallocene-produced polyethylene in an adhesive relationship with said polypropylene layer and having a density of from 0.925 to 0.96 g/cm³ and a melt flow index $MI_2$ within the range of 0.05 to 50 g/10 min. wherein the metallocene-produced polyethylene has an amount of crystallization larger than 4% for chains having less than 10 short chain branches per 1000 carbon atoms, and wherein the metallocene is ethylene bis(4,5,6,7-tetrahydro-1-indenyl)zirconium dichloride.

2. The multilayer film of claim 1 wherein the metallocene-produced polyethylene has a Dow rheological index larger than $5/MI_2$.

3. The multilayer film of claim 1 where said film is formed by co-extruding said polypropylene and said metallocene-produced polyethylene.

4. The multilayer film of claim 1 wherein said metallocene-produced polyethylene and said polypropylene are co-extruded through a flat die.

5. The multilayer film of claim 1 wherein said metallocene-produced polyethylene and said polypropylene are co-extruded through an annular die.

6. The multilayer film of claim 1 consisting of one film layer formed of polypropylene and said metallocene-produced polyethylene adhesive layer.

7. The multilayer film of claim 1 wherein the polypropylene film layer represents from 0.5 to 99.99% of the total film or sheet thickness.

8. The multilayer film of claim 1 wherein said layer of metallocene-produced polyethylene is interspersed between said polypropylene film layer and a polyethylene film layer to provide a tie layer between said polypropylene film layer and said polyethylene film layer.

9. The multilayer film of claim 8 wherein the metallocene-produced polyethylene has a Dow rheological index larger than $5/MI_2$.

10. A multilayer film comprising first and second external film layers, each formed of a metallocene-produced polyethylene having a density within the range of 0.925 to 0.96 g/cm$^3$ and a melt flow index within the range of 0.05 to 50 g/10 min. and an internal layer formed of polypropylene interposed between said external layers and in an adhesive relationship with said external layers wherein the metallocene-produced polyethylene has an amount of crystallization larger than 4% for chains having less than 10 short chain branches per 1000 carbon atoms, and wherein the metallocene is ethylene bis(4,5,6,7-tetrahydro-1-indenyl)zirconium dichloride.

11. The multilayer film of claim 10 wherein the metallocene-produced polyethylene has a Dow rheological index larger than $5/MI_2$.

12. A multilayer film comprising a first film layer formed of polyproyplene and a second film layer formed of polyethylene and further comprising a tic layer formed of metallocene-prodcued polyethylene having a density within the range of 0.91 to 0.96 g/cm$^3$ and a melt flow index $MI_2$ within the range of 0.05 to 50 g/10 min. interposed between said first polyproyplene film layer and said second polyethylene film layer in an adhesive relationship therewith, wherein the metallocene-produced polyethylene has an amount of crystallization larger than 4% for chains having less than 10 short chain branches per 1000 carbon atoms, and wherein the metallocene is ethylene bis(4,5,6,7-tetrahydro-1-indenyl)zirconium dichloride.

13. The multilayer film of claim 12 wherein said metallocene-produced polyethylene tile layer has a density within the range of 0.917 to 0.96 g/cm$^3$.

14. The multilayer film of claim 12 wherein said metallocene-produced polyethylene tie layer has a density within the range of 0.925 to 0.96 g/cm$^3$.

15. The multilayer film of claim 12 wherein the metallocene-produced polyethylene has a Dow rheological index larger than $5/MI_2$.

16. The multilayer film of claim 15 wherein the metallocene-produced polyethylene has a Dow rheological index larger than $10/MI_2$.

17. The multilayer film of claim 16 wherein the metallocene-produced polyethylene has a Dow rheological index larger than $20/MI_2$.

18. A multilayer film comprising:
a film layer formed of polypropylene; and
an adhesive layer formed of a metallocene-produced polyethylene in an adhesive relationship with the film layer, wherein the metallocene-produced polyethylene comprises a density of from 0.925 g/cm$^3$ to 0.96 g/cm$^3$, a melt flow index $MI_2$ of from 0.05 g/10 min. to 50 g/10 min. and an amount of crystallization of greater 4% for chains having less than 10 short chain branches per 1000 carbon atoms and wherein the multilayer film is absent tying additives.

19. A multilayer him comprising:
a film layer formed of polypropylene; and
an adhesive layer consisting essentially of a metallocene-produced polyethylene in an adhesive relationship with the film layer, wherein the metallocene-produced polyethylene comprises a density of from 0.925 g/cm$^3$ to 0.96 g/cm$^3$, a melt flow index $MI_2$ of from 0.05 g/10 min. to 50 g/10 min. and an amount of crystallization of greater 4% for chains having less than 10 short chain branches per 1000 carbon atoms and wherein the metallocene is ethylene bis(4,5,6,7-tetrahydro-1-indenyl)zirconium dichloride.

\* \* \* \* \*

UNITED STATES PATENT AND TRADEMARK OFFICE
CERTIFICATE OF CORRECTION

| | | |
|---|---|---|
| PATENT NO. | : 7,972,706 B2 | Page 1 of 1 |
| APPLICATION NO. | : 10/491692 | |
| DATED | : July 5, 2011 | |
| INVENTOR(S) | : Philippe Marechal et al. | |

It is certified that error appears in the above-identified patent and that said Letters Patent is hereby corrected as shown below:

Claim 12, Column 9, Line 47, the word "tic" should read "tile".

Signed and Sealed this
Twenty-third Day of August, 2011

David J. Kappos
*Director of the United States Patent and Trademark Office*